(12) United States Patent
Pantelias (10) Patent No.: US 9,014,048 B2
(45) Date of Patent: Apr. 21, 2015

(54) DYNAMIC BANDWIDTH RE-ALLOCATION (75) Inventor: Niki Pantelias, Duluth, GA (US)

(73) Assignee: Broadcom Corporation, Irvine, CA (US)

( * ) Notice: Subject to any disclaimer, the term of this patent is extended or adjusted under 35 U.S.C. 154(b) by 90 days.

(21) Appl. No.: 13/538,037

(22) Filed: Jun. 29, 2012

(65) Prior Publication Data
US 2013/0051276 A1    Feb. 28, 2013

Related U.S. Application Data (60) Provisional application No. 61/526,504, filed on Aug. 23, 2011.

(51) Int. Cl.
| | |
|---|---|
| H04L 1/00 | (2006.01) |
| H04L 12/26 | (2006.01) |
| H04L 12/24 | (2006.01) |
| H04L 12/923 | (2013.01) |
| H04L 12/927 | (2013.01) |
| H04L 12/911 | (2013.01) |
| H04L 29/06 | (2006.01) |
| H04N 21/442 | (2011.01) |

(Continued)

(52) U.S. Cl.
CPC ...... *H04N 21/44209* (2013.01); *H04L 41/0896* (2013.01); *H04L 47/215* (2013.01); *H04L 47/762* (2013.01); *H04L 47/805* (2013.01); *H04L 47/822* (2013.01); *H04L 65/4084* (2013.01); *H04L 65/605* (2013.01); *H04L 65/80* (2013.01); *H04Q 11/0067* (2013.01); *H04Q 2011/0064* (2013.01)

(58) Field of Classification Search
CPC .. H04Q 1/0478; H04L 12/5602; H04L 47/10; H04L 47/30; H04L 47/2441
USPC .......................... 370/229, 235, 253, 248, 252
See application file for complete search history.

(56) References Cited

U.S. PATENT DOCUMENTS

| | | | |
|---|---|---|---|
| 2005/0007956 A1* | 1/2005 | Nilsson et al. | 370/232 |
| 2005/0114432 A1* | 5/2005 | Hodges et al. | 709/201 |
| 2005/0255850 A1* | 11/2005 | Auterinen | 455/452.2 |

(Continued)

FOREIGN PATENT DOCUMENTS

CN           101436996 A    5/2009

OTHER PUBLICATIONS

European Search Report, dated Nov. 20, 2012, for European Patent Appl. No. 12005671.8, 4 pages.

(Continued)

*Primary Examiner* — Ronald Abelson
(74) *Attorney, Agent, or Firm* — Sterne, Kessler, Goldstein & Fox P.L.L.C.

(57) ABSTRACT

A method and system for dynamic bandwidth re-allocation is provided. The method includes the steps of monitoring a video streams delivered by a server to a first client and a second client that have a same service level agreement and determining whether the first client is receiving a lower bitrate video stream compared to the second client. The method further includes the step of adjusting a parameter to allow the first client to receive a higher bitrate video stream. In an example, the monitoring, determining and adjusting steps are performed by a cable modem termination system (CMTS). In another example, the monitoring, determining and adjusting steps are performed by an optical line terminal (OLT).

20 Claims, 5 Drawing Sheets (51) Int. Cl.
*H04Q 11/00* (2006.01)
*H04L 12/819* (2013.01)

(56) References Cited

U.S. PATENT DOCUMENTS

| | | | | |
|---|---|---|---|---|
| 2005/0277444 | A1* | 12/2005 | Rensburg et al. | 455/562.1 |
| 2006/0062209 | A1 | 3/2006 | Riley | |
| 2007/0168466 | A1* | 7/2007 | Tooley et al. | 709/218 |
| 2008/0192773 | A1 | 8/2008 | Oui et al. | |
| 2010/0205288 | A1* | 8/2010 | Araujo et al. | 709/223 |
| 2010/0299552 | A1 | 11/2010 | Schlack et al. | |
| 2011/0023061 | A1* | 1/2011 | Ji et al. | 725/39 |
| 2011/0058813 | A1 | 3/2011 | Boyd et al. | |
| 2013/0117463 | A1* | 5/2013 | Agarwal et al. | 709/231 |

OTHER PUBLICATIONS

*Access, Terminals, Transmission and Multiplexing (ATTM); Third Generation Transmission Systems for Interactive Cable Television Services—IP Cable Modems: Part 4: MAC and Upper Layer Protocols; DOCSIS 3.0*, European Telecommunications Standards Institute, Draft Standard ETSI EN 302 878-4 V1.1.0 (Apr. 2011), 648 pages, Copyright 2011.

Communication Pursuant to Article 94(3) EPC, dated Nov. 28, 2012, for European Patent Appl. No. 12005671.8, 7 pages.

*Access, Terminals, Transmission and Multiplexing (ATTM); Third Generation Transmission Systems for Interactive Cable Television Services—IP Cable Modems; Part 4: MAC and Upper Layer Protocols; DOCSIS 3.0*, European Telecommunications Standards Institute, Draft Standard ETSI EN 302 878-4 V1.1.0 (Apr. 2011), 648 pages, Copyright 2011.

English-language abstract of Chinese Patent Publication No. CN 101436996 A, published May 20, 2009; 1 page.

Chinese Office Action directed to related Chinese Patent Application No. 20121303903.8, mailed on Sep. 22, 2014; 12 pages.

* cited by examiner

DYNAMIC BANDWIDTH RE-ALLOCATION

CROSS-REFERENCE TO RELATED APPLICATIONS

This application claims the benefit of U.S. Provisional Application No. 61/526,504 filed Aug. 23, 2011, which is incorporated herein by reference in its entirety.

BACKGROUND OF THE INVENTION

1. Field of the Invention

This invention is generally related to dynamic bandwidth re-allocation.

2. Background Art

Online video delivery involves the transport of a video file, in the form a video stream, from a server that stores the video file to a client that requests online delivery of the video file. Typically, the client determines a bitrate of the connection with the server and requests the video stream at a bitrate that can be sustained by the connection. However, network conditions may arise that cause a first client to receive a lower bit rate than a second client, even if both clients have the same service level agreement with their network service provide for bandwidth allocation. In response to the lower bitrate conditions, the first client will request the server to switch to a lower bitrate video stream. This results in an inequitable distribution of bandwidth between the first client and the second client for the same service level.

There is a need for methods and systems to overcome the above-mentioned deficiency.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

The present invention will now be described with reference to the accompanying drawings. In the drawings, like reference numbers may indicate identical or functionally similar elements.

DETAILED DESCRIPTION OF THE INVENTION

While the present disclosure is described herein with reference to illustrative embodiments for particular applications, it should be understood that the disclosure is not limited thereto. Those skilled in the art with access to the teachings provided herein will recognize additional modifications, applications, and embodiments within the scope thereof and additional fields in which the disclosure would be of significant utility.

Figure 1:
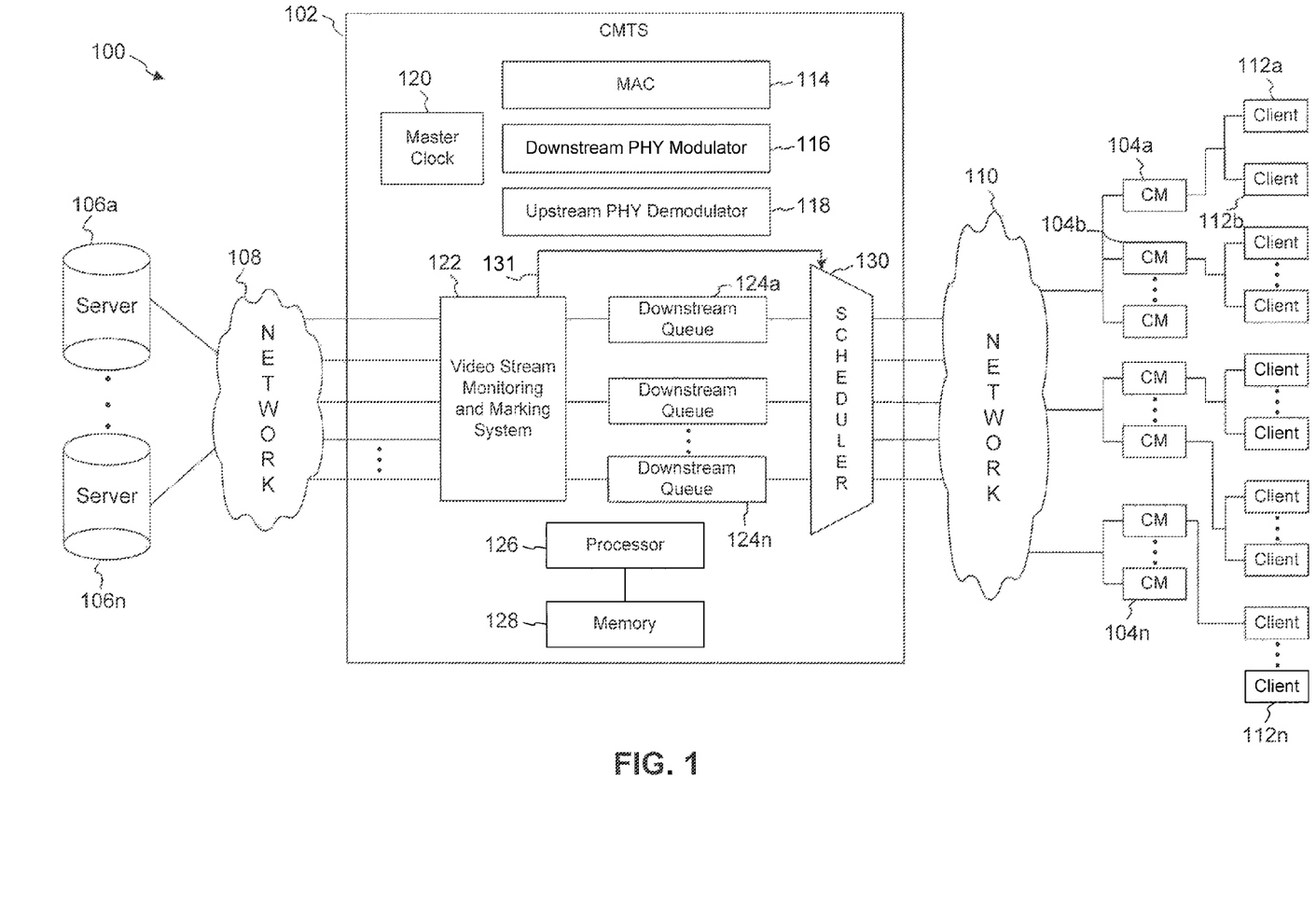
FIG. 1 illustrates an example system according to an embodiment of the invention.

FIG. 1 illustrates an example system 100 according to an embodiment of the invention. System 100 includes a cable modem termination system (CMTS) 102 coupled to one or more cable modems (CM) 104a-n via a network 110. Each cable modem 104 may be coupled to one or more clients 112a-n. CMTS 102 is also coupled to one or more servers 106a-n via network 108. Network 108 may be any type of network including but not limited to the Internet, a local area network (LAN) or a wide area network (WAN). It is to be appreciated that the type of network 108 is a design choice and may be arbitrary. In embodiments presented herein, "n" is an arbitrary positive integer.

CMTS 102 may include a media access controller (MAC) 114, a downstream physical layer modulator (DS PHY) 116 and an upstream physical layer demodulator (US PHY) 118. CMTS 102 may also include a master clock 120, video stream monitoring and marking unit 122, one or more downstream queues 124 and a scheduler 130. In an embodiment, CMTS 102 may include a processor 126 coupled to a memory 128. The functions described herein as being performed by CMTS 102 or by video stream monitoring and marking unit 122 may be performed by processor 126 based on instructions stored in memory 128. CMTS 102 is also coupled to network 110 which provides interconnectivity between CMTS 102 and cable modems 104. Network 110 supports wired, wireless, or both transmission media, including satellite, terrestrial (e.g., fiber optic, copper, twisted pair, coaxial, or the like), radio, microwave, free-space optics, and/or any other form or method of transmission. In an embodiment a DOCSIS network is part of network 110.

US PHY 118 fauns the physical layer interface between CMTS 102 and the upstream channels of network 110. CMTS 102 may include a separate US PHY 118 for each one of the upstream channels. US PHY 118 receives and demodulates all bursts from cable modems 104.

DS PHY 116 forms the physical layer interface between CMTS 102 and the downstream channel(s) of network 110. Hence, video, voice, data and/or control messages that are destined for one or more cable modems 104 are collected at DS PHY 116 and transmitted to the respective cable modems 104. DS PHY 116 modulates and/or formats the information for downstream transmission.

MAC 114 receives the upstream signals from US PHY 118 and provides the downstream signals to DS PHY 116, as appropriate. MAC 114 operates as the lower sublayer of the data link layer of CMTS 102. In embodiments, MAC 114 supports fragmentation, concatenation, payload header suppression/expansion, and/or error checking for signals transported over the physical layer.

Memory 128 may interact with MAC 114 to store the signals as they are processed by MAC 114. Memory 128 may also store various auxiliary data used to support the processing activities. Such auxiliary data includes security protocols, identifiers, rules, policies etc.

Figure 2:
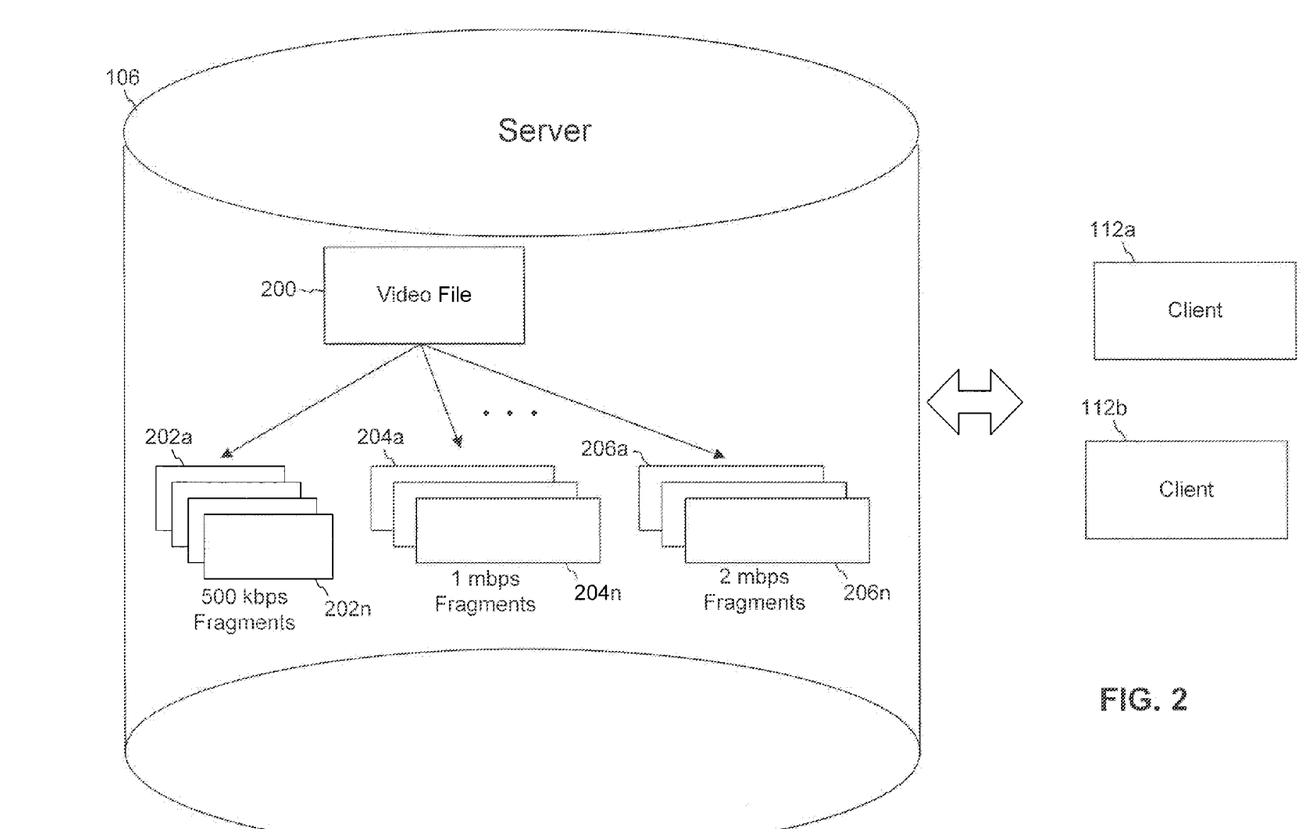
FIG. 2 illustrates an example video streaming session between a server and a client.

In an example, the client 112 may be any wired or wireless computational device including but not limited to a personal computer, a laptop computer, a cellphone, personal digital assistant (PDA) or a media player such as an iPod™ or iPad™. In another example, a client 112 may be integrated with a cable modem 104 in a single device (not shown). Client 112 may request delivery of a video stream from a server 106. This request is received by the CMTS 102 and relayed to the server 106. In response to the request from the client 112 for the video stream, server 106 sends the requested media stream to client 112. FIG. 2 illustrates an example video streaming session between server 106 and client 112. Server 106 stores a video file 200 in multiple sizes for transmission at different bitrates. The different bitrates are a result of different levels of compression. Compression involves decimation of certain redundant data in video images. A bit rate reduction system operates by removing redundant information from a video at an video encoder prior to transmission and re-inserting the redundant information at a decoder. At its most basic level, compression is performed when an input video stream is analyzed and information that is indiscernible to the viewer is discarded. Each event is then assigned a code where commonly occurring events are assigned fewer bits and rare events are assigned more bits. For example, a specific duration of a video (usually several seconds long) is stored by server 106 as fragments of differing compressions levels and hence differing sizes. In an example, server 106 stores 500 kilobits per second (kbps) fragments 202, 1 megabits per second (Mbps) fragments 204 and 2 mbps fragments 206 at different levels of compression. Each of fragments 202, 204, and 206 correspond to the same duration of a video, but have differing compression levels and hence have different sizes and different levels of quality.

Thus, server 106 stores the same video file 200 in fragments of different sizes to allow for video stream delivery at different bitrates and at different levels of quality. The quality of a video stream depends on the bitrate of the video stream delivered by server 106 to client 112. The bitrate of the video stream in turn depends on the size of the fragments of the video file being delivered. For example, fragments 206 result in a higher bitrate and hence a higher quality video stream than fragments 204 and fragments 204 result in a higher quality video stream than fragments 202. Thus, storing the same video file 200 in different sizes allows server 106 to support different bitrates that may be requested by a client 112. The quality (and hence bitrate) of the stream to be used is chosen by the client 112 based on its perception of network conditions. However, a client 112 does not actually have information about the network as a whole. A client 112 is not aware of what other clients 112 are doing, nor is it aware of the total network capacity or how that capacity ideally would be allocated. A single client 112 estimates network conditions based on the latency and rate of the video fragments it receives from server 106. If it appears to the client 112 that the latency is long (i.e. it takes a long time between a request for a fragment from server 106 and the beginning of arrival of the fragment), or the rate is low (i.e. slow packet arrival once the fragment does start to arrive), the client 112 may decide that network conditions are poor and ask for a lower bitrate stream from server 106. In response to a lower bitrate stream, server 106 switches to lower bitrate fragments Conversely, if it appears to a client 112 that it is receiving fragments faster (i.e. low latency and/or high rate), it may ask for a higher bitrate stream from server 106. Server 106 in response to the request for a higher bitrate stream switches client 112 to a higher bitrate fragments. However, since the client doesn't have information about the network as a whole, it may make an incorrect estimation of about network conditions.

In an example, assume there are two clients behind two different cable modems—client 112a behind cable modem 104a and client 112b and behind cable modem 104b—both with the same service level agreement (SLA.) In another example, both clients 112a and 112b might be behind the same cable modem 104. A service level agreement as referred to herein refers to a service contract between a network provider and a client that guarantees a certain level of service to the client, for example, a specific amount of upstream and/or downstream bandwidth. In the current example, both client 112a and 112b request a video at about the same time. Out of available high-rate, medium-rate, and low-rate streams, both choose the medium-rate stream and are provided medium-rate fragments such as fragments 204. Now suppose some temporary network congestion event occurs. By coincidence, this event causes delayed or lost packets for client 112a, but not client 112b. This coincidence could happen, for example, because clients 112a and 112b are communicating with different video servers 106, and the temporary network congestion event occurred on a link that is in a path of a server 106 supplying content to client 112a, but not in a path of a server 106 that supplies content to client 112b. Or, the coincidence could happen because at the moment in time when client 112a requested a fragment, congestion was present, but at a different moment (perhaps a second or two earlier or later) when client 112b requested a fragment, from a same or a different server 106, there was no congestion.

The temporary network congestion event could cause client 112a to decide that network conditions are poor and request the low-rate (lower quality) stream. Meanwhile, client 112b was unaffected by the temporary event so it does not ask for a lower bitrate stream. In fact, when client 112a switches to a lower bitrate, client 112b may perceive that network conditions have improved (since client 112a is consuming less bandwidth, potentially resulting in less delay on packets destined for client 112b) and client 112b may attempt to switch to the high-rate stream. If this happens, once client 112b is consuming the high-rate stream, even though the temporary network congestion event has ended, client 112a may still not estimate that network conditions have improved enough to switch back to the medium-rate stream. This is because the additional packets being delivered to client 112b may slightly delay packets corresponding to client 112a. Alternatively, client 112a may estimate that network conditions have improved, but only after a long period of time. Since the medium-rate stream previously failed, client 112a will probably not immediately try to switch back to it, since if this attempt fails, it may cause disruption to the picture quality seen by a user using client 112a. Client 112a will wait to be certain that network conditions have improved before attempting to switch back to the medium-rate stream.

Thus, the consequence of the temporary network congestion event is that client 112a ends up with a lower bitrate (and hence lower quality) stream than what it started with, while client 112b ends up with a higher bitrate (and hence higher quality) stream than what it started with, even though the two users have the same service level agreement and should therefore be receiving the same quality of video. This condition could persist for a long time because client 112a will not immediately try to reacquire a higher bitrate stream, and if it does, it may still have trouble due to bandwidth consumed by client 112b. The CMTS 102 and the CM 104 are typically not parties to the exchange between the client 112 and the server 106. Thus, the CMTS 102 cannot simply command both clients 112a and 112b to switch back to the medium-rate stream.

To overcome these problems, according to an embodiment of the disclosure, the CMTS 102 (or OLT in the case of a PON system) tries to influence decision of a client 112 indirectly by adjusting various parameters, as described below, so as to cause, as in the example above, client 112b to perceive slightly lower network performance, and/or client 112a to perceive slightly higher network performance. This will accelerate the perception of client 112a of improved network conditions allowing it to switch back to the medium-rate stream, and/or cause client 112b to see slightly degraded network conditions causing it to switch back to the medium-rate stream. For example, parameters may be adjusted so that client 112a has more bandwidth and can ratchet up from low quality fragments 202 to medium quality fragments 204 and parameters may be adjusted so that client 112b has lesser bandwidth and has to ratchet down from highest quality fragments 206 to medium quality fragments 204.

In another example, parameters may be adjusted so that client 112a may be able to receive a higher bitrate video stream from server 106 while maintaining the bitrate received by client 112b. For example, parameters may be adjusted so that client 112a and client 112b can both stream high quality fragments 206.

Referring again to FIG. 1, video stream monitoring and marking system 122 monitors a video stream delivered by a server 106 to a client 112 to determine the bitrate of the video stream. Video stream monitoring and marking system 122 determines whether a client 112a is receiving a lower bitrate compared to other clients 112 that have the same service level agreement. In another example, video stream monitoring and marking system 122 detects a request by client 112a to reduce a bitrate of a video stream while other clients 112 with the same service level agreement are receiving a higher bitrate video stream. For example, video stream monitoring and marking system 122 detects a request by client 112a for a lower bitrate video stream than client 112b. In another example, video stream monitoring and marking system 122 detects a request by client 112a for a lower bitrate video stream than what the client 112a originally requested at a start of a video session while another client 112b continues to request a higher bitrate video stream for the same service level agreement. In a further example, instead of monitoring a bitrate, video stream monitoring and marking system 122 may monitor control messages on a control channel (not shown) between client 112 and server 106 to detect a request from client 112a to server 106 for a lower bitrate video stream compared to client 112b. In another example, video stream monitoring and marking system 122 may monitor both a bitrate of the video stream and control messages between client 112a and server 106 to determine whether client 112a is receiving a lower bitrate stream than client 112b.

Figure 3A:
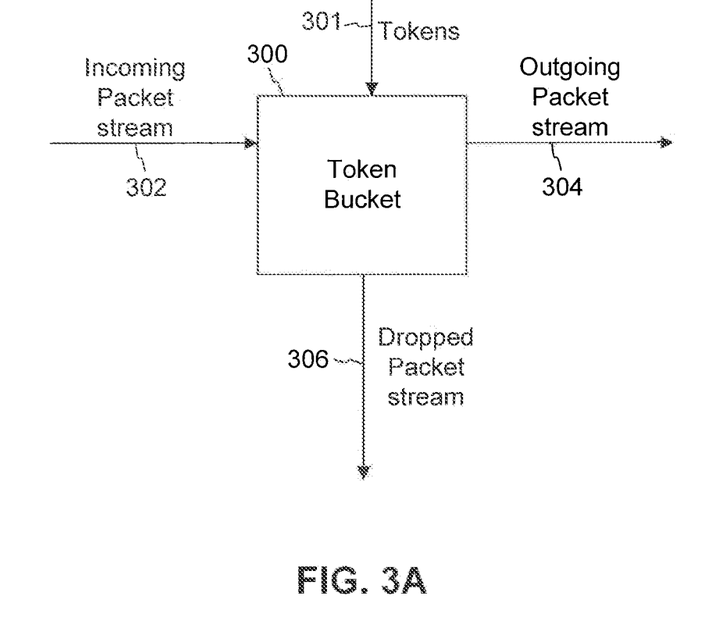
FIG. 3A illustrates an example token bucket according to an embodiment of the invention.

Upon detecting unequal bandwidth distribution between client 112a and client 112b, CMTS 102 adjusts parameters to allow client 112a to receive a higher bitrate video stream. In an embodiment, the parameter adjusted by video stream monitoring and marking system 122 is a token bucket parameter. FIG. 3A illustrates an exemplary token bucket according to an embodiment of the disclosure. Token bucket 300 represents a policing function that controls a rate at which packets are delivered to clients 112. Incoming packet stream 302 represents the packets coming into token bucket 300 for transmission to a client 112. Outgoing stream 304 represents the packets transmitted by token bucket 300 to a client 112. Dropped packet stream 306 represents non-conformant packets that are dropped by token bucket 300. Token bucket 300 may be a part of scheduler 130. In another example, token bucket 300 may be a software construct that runs on processor 126 based on instructions stored in memory 128.

Token bucket 300 is defined by parameters "r" and "b." Parameter r denotes the rate at which tokens 301 are added to token bucket 300. A token 301 is added to the bucket every 1/r seconds. The token bucket 300 can hold at the most "b" tokens. If a token 301 arrives when the token bucket 300 is full, then the token 301 is discarded. When an incoming packet of n bytes is received by token bucket 300, n tokens are removed from the bucket, and the packet is sent to the network in outgoing packet stream 304. If fewer than n tokens are available, no tokens are removed from the token bucket 300, and the packet is considered to be non-conformant. Non-conformant packets may be buffered for later transmission or dropped via drop packet stream 306.

In DOCSIS networks, Maximum Sustained Rate is equivalent to r and Maximum Traffic Burst is equivalent to b. According to an embodiment of the disclosure, video stream monitoring and marking system 122 may add tokens r by increasing the Maximum Sustained Rate for video packets corresponding to a client 112a that is to receive a higher bitrate video stream, thereby preventing its packets from being dropped. Video stream monitoring and marking system 122 may concurrently remove tokens r for a client 112b that is receiving a higher bitrate by decreasing the Maximum Sustained Rate for video packets corresponding to client 112b, thereby equalizing bandwidth distribution between clients 112a and 112b. In an example, a Maximum Traffic Burst parameter could also be adjusted to equalize bandwidth distribution between clients 112a and 112b.

In another embodiment, video stream monitoring and marking system 122 may adjust a drop level threshold for a downstream queue 124 such that video packets for a client 112a which is to receive a higher bitrate video stream are not dropped or are dropped at a lower frequency compared to client 112b.

Figure 3B:
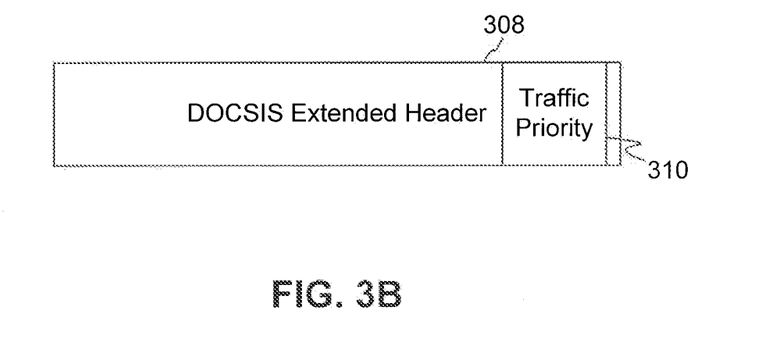
FIG. 3B illustrates and example downstream service flow extended header according to an embodiment of the invention.

In another embodiment, the parameters adjusted by video stream monitoring and marking system 122 are bits in a Downstream Service Extended Header (DS EHDR) 308 as shown in FIG. 3B. Downstream Service Extended Header 308 includes a 3-bit Traffic Priority field 310. Changing the value of the traffic priority field 310 causes the CM 104 to give a different level of priority to a first packet having a first value in the traffic priority field 310, relative to a second packet arriving at the same CM 104 which has a second value in its respective traffic priority field 310 that is different from the first value. By adjusting these bits in a downstream direction, video stream monitoring and marking system 122 allows client 112a to receive a higher bitrate video stream from server 106 compared to client 112b.

In a further example, video stream monitoring and marking system 122 sends a signal 131 to adjust a Maximum Downstream Latency parameter associated with scheduler 130 so as to assign higher priority to a video stream delivered to the client 112a. The scheduler 130 takes Maximum Downstream Latency into account when making scheduling decisions. For example, video stream monitoring and marking system 122 adjusts the Maximum Downstream Latency parameter so that packets in downstream queues 126a-n destined for a particular client 112a are assigned higher priority by scheduler 130 compared to packets for other clients, e.g. client 112b. Flows with a lower Maximum Downstream Latency will tend to have packets wait in downstream queues 124 for less time than flows with higher Maximum Downstream Latency.

In another example, video stream monitoring and marking system 122 may adjust other Quality of Service (QoS) parameters such as a Traffic Priority parameter to allow a client 112a to receive a higher bitrate video stream compared to client 112b. The Traffic Priority parameter is similar to the traffic priority field 310, but it affects the priority at the scheduler 130, whereas the traffic priority field in the downstream service extended header 308 affects priority within a cable modem 104 that processes the downstream service extended header 310. In an example, video stream monitoring and marking system 122 sends a signal 131 to scheduler 130 to adjust the traffic priority parameter such that packets associated with client 112a are assigned higher priority and a lower priority is assigned to packets associated with client 112b.

In yet another embodiment, video stream monitoring and marking system 122 may adjust parameters 131 in scheduler 130 so as to schedule video packets for a client 112a that is to receive a higher bitrate video stream ahead of packets corresponding client 112b.

In an embodiment, video stream monitoring and marking system 122 may adjust more than one parameter to allow client 112a to receive a higher bitrate video stream. For example, video stream monitoring and marking system 122 may adjust a combination of DOCSIS extended flow header, token bucket parameters, latency level parameters, QoS parameters, and drop level threshold to allow client 112a to receive a higher bitrate video stream from server 106.

Minimum Reserved Rate, Downstream Peak Rate, or Vendor-Specific QoS parameters could also be used to implement other algorithms. It is to be appreciated the type of parameters adjusted or the means used to provide higher priority to packets belonging to a certain client 112 may differ without departing from the scope of the disclosures herein.

In an embodiment, video stream monitoring and marking system 122 may be in an Optical Line Terminal (OLT) that is located between server 106 and client 112. In this embodiment, video stream monitoring and marking system 122 performs similar steps as described above to allow a client 112 to obtain a higher bitrate video stream. For example, the video stream monitoring and marking system 122 adjusts a "color" of packets assigned to a video stream delivered to client 112a that is to receive a higher bitrate video stream. The color may be indicated by a particular number of bit(s) field(s). For example, red may be indicated by the number 5 and correspond to high priority packets that are not dropped whereas green may be indicated by the number 3 and indicate a medium priority packet that may be dropped if there is congestion. According to an embodiment of the disclosure, the color may be adjusted so that packets assigned to a client 112a whose bitrate is being adjusted gets higher priority compared to other clients 112 that have the same service level agreement. It is to be appreciated that the type of color or number or bit(s) used to indicate the color are design choices and may be arbitrary. In another example, the video stream monitoring and marking system 122 may adjust r for a token bucket, a latency level parameter or a drop level threshold so as to assign higher priority to the video stream delivered to client 112a.

In an example, video stream monitoring and marking system 122 may be external to CMTS 102 or to the OLT. It is to be appreciated that video stream monitoring and marking function 122 may be implemented solely in hardware such as logic gates and/or circuits. In another embodiment, video stream monitoring and marking function 122 may be implemented solely as software running on processor 126. In a further embodiment, video stream monitoring and marking function 122 may be implemented as a combination of hardware and software.

Figure 4:
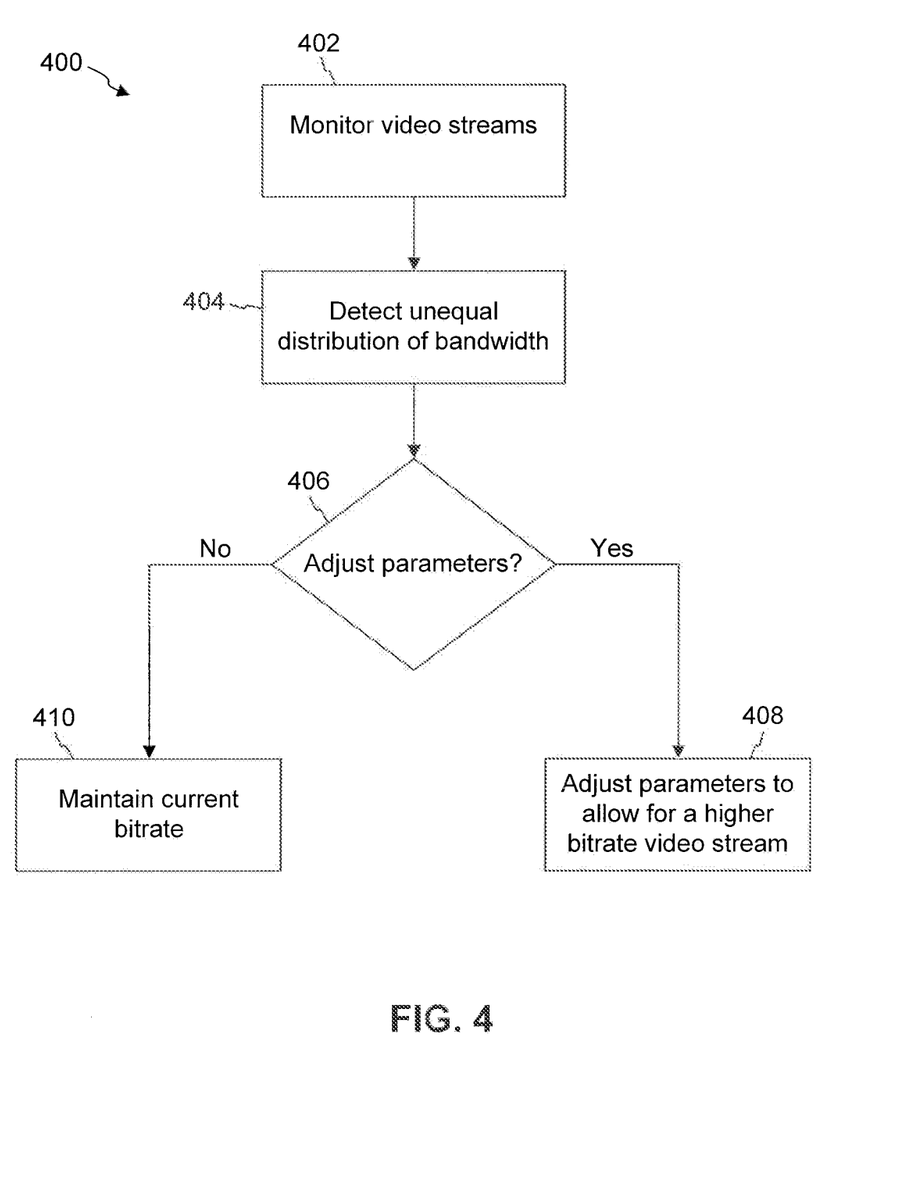
FIG. 4 illustrates an example flowchart illustrating exemplary steps for dynamic bandwidth re-allocation, according to an embodiment of the invention.

FIG. 4 illustrates an example flowchart 400 for dynamic bandwidth re-allocation, according to an embodiment of the disclosure. Flowchart 400 will be described with continued reference to the example operating environment depicted in FIGS. 1-3. However, the flowchart is not limited to that embodiment. Note that some steps shown in flowchart 400 do not necessarily have to occur in the order shown. In an example, the steps are performed by video stream monitoring and marking system 122.

In step 402, a video stream and/or a control channel between a client and a server is monitored. For example, video stream monitoring and marking system 122 monitors a video stream and/or control channel between client 112 and server 106.

In step 404, unequal distribution of bandwidth is detected. For example, video stream monitoring and marking system 122 detects that a client 112a is receiving or is requesting a lower bitrate video stream compared to a client 112b that has the same service level agreement.

In step 406, it is determined whether parameters are to be adjusted so as to allow for a higher bitrate video stream. For example, video stream monitoring and marking system 122 determines whether clients 112a and clients 112b have the same service level agreement. If it is determined that they have the same service level agreement, then parameters for client 112a are to be adjusted and the process proceeds to step 408. If it is determined that clients 112b has a higher service level agreement than client 112b, then parameters are not to be adjusted and the process proceeds to step 410.

In step 408, parameters are adjusted to allow for a higher bitrate video stream. For example, video stream monitoring system 122 may adjust parameters such as a latency control, bits in a DOCSIS extended header, QOS parameters, drop level threshold or token bucket parameters to allow client 112a to receive a higher bitrate video stream.

In step 410, a current bitrate for client 112a is maintained.

Embodiments presented herein, or portions thereof, can be implemented in hardware, firmware, software, and/or combinations thereof.

The embodiments presented herein apply to any communication system between two or more devices or within sub-components of one device. The representative functions described herein (e.g. steps in FIG. 4) can be implemented in hardware, software, or some combination thereof. For instance, the steps of FIG. 4 can be implemented using computer processors, such as processor 126, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 5:
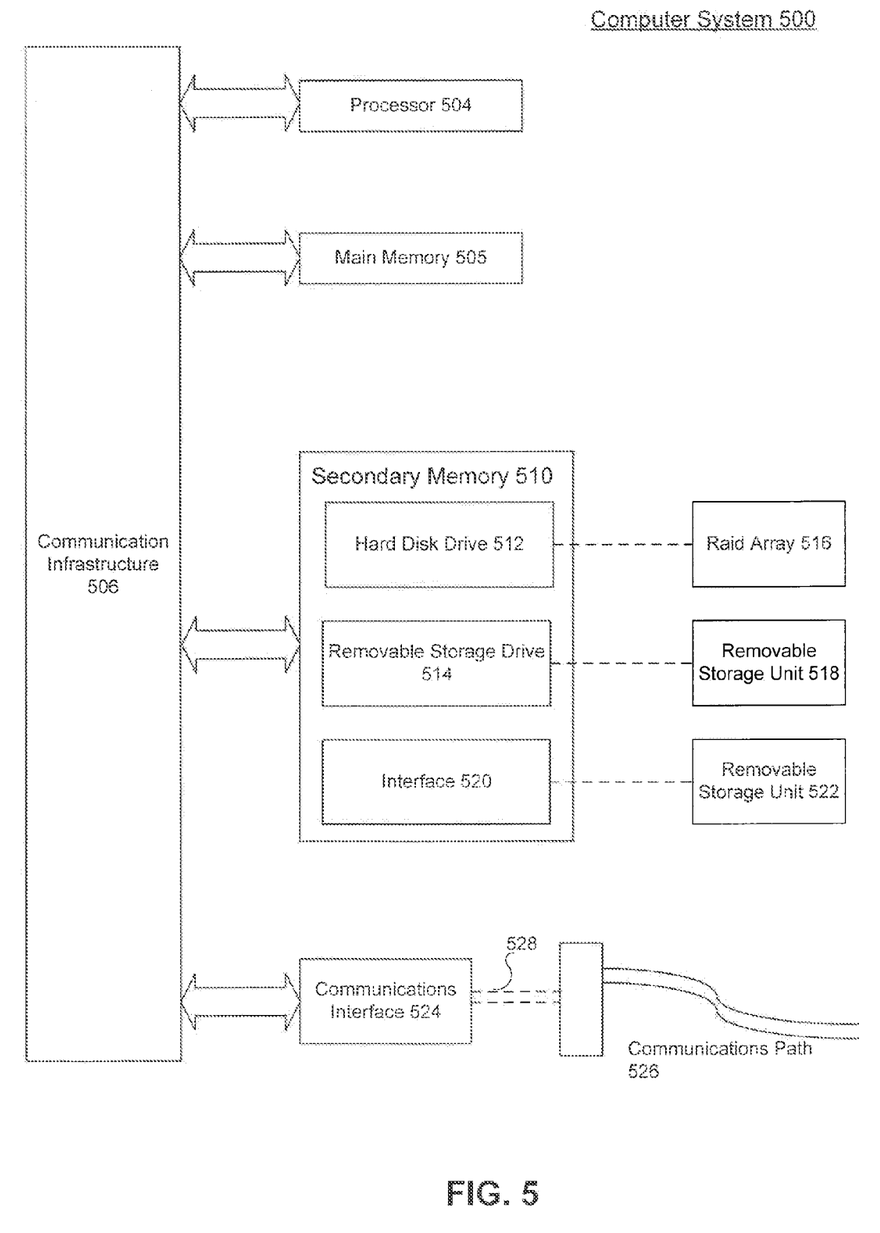
FIG. 5 is a block diagram of an exemplary computer system on which the present invention can be implemented.

The following describes a general purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 500 is shown in FIG. 5. The computer system 500 includes one or more processors, such as processor 504. Processor 504 can be a special purpose or a general purpose digital signal processor. The processor 504 is connected to a communication infrastructure 506 (for example, a bus or network). Various software implementations are described in terms of this exemplary computer system. After reading this description, it will become apparent to a person skilled in the relevant art how to implement the disclosure using other computer systems and/or computer architectures.

Computer system 500 also includes a main memory 505, preferably random access memory (RAM), and may also include a secondary memory 510. The secondary memory 510 may include, for example, a hard disk drive 512, and/or a RAID array 516, and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518 represents a floppy disk, magnetic tape, optical disk, etc. As will be appreciated, the removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a PCMCIA slot and card, etc. Software and data transferred via communications interface 524 are in the form of signals 528 which may be electronic, electromagnetic, optical or other signals capable of being received by communications interface 524. These signals 528 are provided to communications interface 524 via a communications path 526. Communications path 526 carries signals 528 and may be implemented using wire or cable, fiber optics, a phone line, a cellular phone link, an RF link and other communications channels.

The terms "computer program medium" and "computer usable medium" are used herein to generally refer to media such as removable storage drive 514, a hard disk installed in hard disk drive 512, and signals 528. These computer program products are means for providing software to computer system 500.

Computer programs (also called computer control logic) are stored in main memory 505 and/or secondary memory 510. Computer programs may also be received via communications interface 524. Such computer programs, when executed, enable the computer system 500 to implement the present disclosure as discussed herein. In particular, the computer programs, when executed, enable the processor 504 to implement the processes of the present disclosure. For example, when executed, the computer programs enable processor 504 to implement part of or all of the steps described above with reference to FIG. 4. Where the disclosure is implemented using software, the software may be stored in a computer program product and loaded into computer system 500 using raid array 516, removable storage drive 514, hard drive 512 or communications interface 524.

In other embodiments, features of the disclosure are implemented primarily in hardware using, for example, hardware components such as Application Specific Integrated Circuits (ASICs) and programmable or static gate arrays. Implementation of a hardware state machine so as to perform the functions described herein will also be apparent to persons skilled in the relevant art(s).

Conclusion

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

What is claimed is:

1. A cable modem termination system (CMTS), comprising:
   a video flow monitoring and marking system that is configured to:
   monitor video streams delivered by a server to a first client and a second client, wherein the first client and the second client have a same service level agreement;
   determine whether the first client is receiving a lower bitrate video stream compared to the second client; and
   adjust a parameter to allow the first client to receive a higher bitrate video stream; and
   a downstream physical layer modulator coupled to the video flow monitoring and marking system, and configured to transmit video streams received from the server to the first and second clients, wherein the video flow monitoring and marking system is further configured to adjust a parameter in a downstream service flow extended header to assign higher priority to the video stream delivered to the first client.

2. The CMTS of claim 1, wherein the video flow monitoring and marking system is further configured to adjust the parameter to reduce bandwidth allocation to the second client to equalize bandwidth distribution between the first client and the second client.

3. The CMTS of claim 1, wherein the video flow monitoring and marking system is further configured to determine a bitrate of a video stream delivered to the first client and the second client.

4. The CMTS of claim 1, wherein the video flow monitoring and marking system is further configured to monitor control messages on a control channel between the first client and the server to detect a request from the first client to the server for a lower bitrate video stream compared to the second client.

5. The CMTS of claim 1, wherein the video flow monitoring and marking system is further configured to determine a service level agreement for the first client and the second client.

6. The CMTS of claim 1, wherein the service level agreement specifies the downstream bandwidth allocated to a client.

7. The CMTS of claim 1, wherein the video flow monitoring and marking system is further configured to adjust a sustained cell rate parameter in a token bucket to assign higher priority to the video stream delivered to the first client.

8. The CMTS of claim 1, wherein the video flow monitoring and marking system is further configured to adjust a latency level parameter to assign higher priority to the video stream delivered to the first client.

9. A method, comprising:
monitoring video streams delivered by a server to a first client and a second client, wherein the first client and the second client have a same service level agreement;
determining whether the first client is receiving a lower bitrate video stream compared to the second client; and
adjusting a latency level parameter to assign higher priority to the video stream delivered to the first client to allow the first client to receive a higher bitrate video stream.

10. The method of claim 9, wherein the adjusting further comprises adjusting the parameter to reduce bandwidth allocation to the second client to equalize a bandwidth distribution between the first and the second client.

11. The method of claim 9, wherein the determining further comprises monitoring control messages on a control channel between the first client and the server to detect a request from the first client to the server for a lower bitrate video stream compared to the second client.

12. The method of claim 9, wherein the adjusting further comprises adjusting a parameter in a downstream service flow extended header to assign higher priority to the video stream delivered to the first client.

13. The method of claim 9, wherein the adjusting further comprises adjusting a sustained cell rate parameter in a token bucket to assign higher priority to the video stream delivered to the first client.

14. The method of claim 9, wherein the monitoring, the determining, and the adjusting steps are performed by an Optical Line Terminal (OLT).

15. The method of claim 14, wherein the adjusting further comprises changing a color of packets to assign higher priority to the video stream delivered to the first client.

16. The method of claim 14, wherein the adjusting further comprises changing a drop threshold of packets to assign higher priority to the video stream delivered to the client.

17. An optical line terminal (OLT), comprising:
a video flow monitoring and marking system, wherein the video flow monitoring and marking system is configured to:
monitor video streams delivered by a server to a first client and a second client that have a same service level agreement;
determine whether the first client is receiving a lower bitrate video stream compared to the second client; and
adjust a parameter to allow the first client to receive a higher bitrate video stream;
and
a downstream physical layer modulator coupled to the video flow monitoring and marking system, and configured to transmit video streams received from the server to the first and second clients.

18. The OLT of claim 17, wherein the video flow monitoring and marking system is further configured to change a color of a packet to assign higher priority to the video stream delivered to the first client.

19. The OLT of claim 17, wherein the video flow monitoring and marking system is further configured to adjust a sustained cell rate parameter in a token bucket to assign higher priority to the video stream delivered to the first client.

20. The OLT of claim 17, wherein the video flow monitoring and marking system is further configured to adjust a latency level parameter to assign higher priority to the video stream delivered to the first client.

* * * * *